US009865083B2

(12) United States Patent
Chen et al.

(10) Patent No.: US 9,865,083 B2
(45) Date of Patent: Jan. 9, 2018

(54) APPARATUS AND METHOD FOR INPAINTING THREE-DIMENSIONAL STEREOSCOPIC IMAGE

(71) Applicant: INDUSTRIAL TECHNOLOGY RESEARCH INSTITUTE, Hsinchu (TW)

(72) Inventors: Hsin-Jung Chen, Yilan County (TW); Feng-Hsiang Lo, Jhubei (TW); Sheng-Dong Wu, New Taipei (TW); Ming-Yu Lin, Taichung (TW); Chun-Te Wu, Taoyuan (TW); Hao-Wei Peng, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 501 days.

(21) Appl. No.: 14/662,426

(22) Filed: Mar. 19, 2015

(65) Prior Publication Data
US 2015/0193965 A1 Jul. 9, 2015

Related U.S. Application Data

(63) Continuation-in-part of application No. 13/032,729, filed on Feb. 23, 2011, now abandoned.

(30) Foreign Application Priority Data

Nov. 3, 2010 (TW) .............................. 99137867 A

(51) Int. Cl.
G06T 15/00 (2011.01)
G06K 9/42 (2006.01)
(Continued)

(52) U.S. Cl.
CPC ............ G06T 15/205 (2013.01); G06T 5/005 (2013.01); H04N 13/0011 (2013.01); H04N 13/026 (2013.01); H04N 13/0271 (2013.01)

(58) Field of Classification Search
CPC .............................. G06T 5/005; H04N 13/026
See application file for complete search history.

(56) References Cited

U.S. PATENT DOCUMENTS 5,929,859 A 7/1999 Meijers
7,755,645 B2 7/2010 Sun et al.
(Continued)

FOREIGN PATENT DOCUMENTS

TW 200535786 11/2005
WO 2010013171 A1 2/2010

OTHER PUBLICATIONS

TW Office Action dated Jun. 5, 2013.
(Continued)

*Primary Examiner* — Joseph Ustaris
*Assistant Examiner* — Rebecca Volentine
(74) *Attorney, Agent, or Firm* — McClure, Qualey & Rodack, LLP

(57) ABSTRACT

An apparatus and a method for rendering three-dimensional stereoscopic images are provided. The apparatus comprises a multi-view processor, an object device, a depth device, and a block filling device. The multi-view processor obtains depth related data of a first pixel and a second pixel which are adjacent to each other on the input image, calculates a difference between the depth related data and determines whether the first pixel and the second pixel are continuous according to the difference. The object device executes a process of object detection to output contour information. The depth device executes a process of object judgment to output distance information. The block filling device detects (Continued)

a hole region in each viewpoint image, searches a search region adjacent to the hole region for a number of original pixels, and fills the hole region.

36 Claims, 14 Drawing Sheets

(51) Int. Cl.

| | | |
|---|---|---|
| *G06K 9/44* | (2006.01) | |
| *G06K 9/00* | (2006.01) | |
| *G06T 15/20* | (2011.01) | |
| *H04N 13/00* | (2006.01) | |
| *H04N 13/02* | (2006.01) | |
| *G06T 5/00* | (2006.01) | |

(56) References Cited

U.S. PATENT DOCUMENTS

| | | | |
|---|---|---|---|
| 2006/0078220 A1 | 4/2006 | Okubo et al. | |
| 2006/0192857 A1 | 8/2006 | Kondo et al. | |
| 2007/0024614 A1 | 2/2007 | Tam et al. | |
| 2008/0187219 A1 | 8/2008 | Chen et al. | |
| 2008/0267527 A1* | 10/2008 | Berretty | G06T 15/20 382/276 |
| 2009/0016640 A1* | 1/2009 | Klein Gunnewiek | G06T 5/005 382/276 |
| 2009/0103616 A1 | 4/2009 | Ho et al. | |
| 2009/0115780 A1 | 5/2009 | Varekamp et al. | |
| 2009/0190852 A1 | 7/2009 | Lim et al. | |
| 2010/0026712 A1 | 2/2010 | Aliprandi et al. | |
| 2011/0063420 A1 | 3/2011 | Masuda | |
| 2011/0229012 A1 | 9/2011 | Singhal | |
| 2011/0273437 A1 | 11/2011 | Sanderson et al. | |
| 2012/0002868 A1 | 1/2012 | Loui et al. | |
| 2012/0086775 A1 | 4/2012 | Bae et al. | |
| 2012/0268499 A1* | 10/2012 | Izumi | H04N 13/026 345/682 |
| 2013/0076749 A1* | 3/2013 | Maeda | G06T 15/08 345/424 |
| 2014/0376635 A1* | 12/2014 | Senoh | H04N 13/0048 375/240.16 |
| 2015/0003724 A1* | 1/2015 | Noguchi | G06K 9/00677 382/154 |

OTHER PUBLICATIONS

Chen, W.Y., et al.; "Efficient Depth Image Based Rendering with Edge Dependent Depth Filter and Interpolation;" IEEE; 2005; pp. 1-4.

Cheng, C.M., et al.; "Improved Novel View Synthesis from Depth Image with Large Baseline;" IEEE 2008; pp. 1-4.

Chen, W.Y., et al.; "Real-Time Image Based Rendering Hardware Accelerator for Advanced Three Dimensional Television System;" IEEE; 2006; pp. 2069-2072.

* cited by examiner

4a

4b

4c

4d

5a

| a' | i[1] | i[2] | i[3] | b' |
|---|---|---|---|---|
| PV(a) | PV(a) | PV(b) | PV(b) | PV(b) |
| PV(a) | PV(a) | PV(b) | PV(b) | PV(b) |
| PV(a) | PV(a) | PV(b) | PV(b) | PV(b) |
| PV(a) | PV(a) | PV(b) | PV(b) | PV(b) |
| PV(a) | PV($\frac{a+b}{2}$) | PV($\frac{a+b}{2}$) | PV($\frac{a+b}{2}$) | PV(b) |
| PV(a) | PV($\frac{3}{4}a+\frac{1}{4}b$) | PV($\frac{3}{4}a+\frac{1}{4}b$) | PV($\frac{3}{4}a+\frac{1}{4}b$) | PV(b) |

APPARATUS AND METHOD FOR INPAINTING THREE-DIMENSIONAL STEREOSCOPIC IMAGE

RELATED APPLICATION

This application is a continuation-in-part application of application Ser. No. 13/032,729, filed Feb. 23, 2011, which claims the benefit of Taiwan application Serial No. 99137867, filed Nov. 3, 2010, the contents of which are incorporated herein by reference.

TECHNICAL FIELD

The disclosure relates in general to an apparatus and a method for rendering images, and more particularly to an apparatus and a method for rendering three-dimensional stereoscopic images.

BACKGROUND

With the advance of the technique made in image process, the presentation of visual effect has been gradually brought from two-dimensional plane into three-dimensional space. As regards an input image, processes of generating a three-dimensional image can be classified into two main categories. In a process of a first category where several video cameras are used, the video cameras are positioned at different viewing angles to photograph the same objects, thus obtaining a number of two-dimensional images. In this way, as for the object which is to be presented in three-dimensional space, a number of viewpoint images such as the two-dimensional images captured at different angles can have their image information combined to synthesize a multi-view three-dimensional stereoscopic image.

In a process of a second category where a single video camera is used, the single video camera is positioned at a fixed viewing angle to photograph objects, thus obtaining a single two-dimensional image. In addition, a depth image corresponding to the two-dimensional image is provided to carry distance information of each object in the two-dimensional image. From the depth image, it can be derived that which object is located in the front of the two-dimensional image, i.e., in the front of the frame, and, in contrast thereto, which object is located in the rear of the two-dimensional image, i.e., in the rear of the frame. Therefore, the contained information of the two-dimensional image and the depth image can also be used to synthesize a multi-view three-dimensional stereoscopic image.

As is mentioned above, a single two-dimensional image along with its depth image can result in the generation or synthesis of a multi-view three-dimensional stereoscopic image. In the course of synthesis, a number of viewpoint images are generated and converted into a final image for outputting. Based on the depth image, shifts of image pixels to a new viewing angle are constructed to generate a viewpoint image which a viewer can observe from that viewing angle. However, the generated viewpoint image is not certainly an image with complete, intact image information. In other words, there could be holes remained in some region of the viewpoint image, and objects in the viewpoint image have some of their parts lost.

Refer to both FIGS. 1A, 1B, 1C, 1D, and 1E. FIG. 1A is a schematic diagram showing an original viewpoint image when observed from a center position. FIGS. 1B and 1C are schematic diagrams each showing a shifted viewpoint image when observed from a left position. FIGS. 1D and 1E are schematic diagrams each showing a shifted viewpoint image when observed from a right position. Viewpoint images 10a, 10b, 10c, 10d, and 10e are indicative of five viewpoint images which a viewer can observe at different viewing angles. The viewpoint image 10a is referred to as a viewpoint image at a central viewing angle, a two-dimensional image which is input originally without having its image pixels shifted. The viewpoint images 10b and 10c each are a shifted viewpoint image at a left viewing angle, while the viewpoint images 10d and 10e at a right viewing angle. Objects 110 and 120 in the images are represented by a triangular pattern and a square pattern, respectively. The objects 110 and 120 are in front of a label 140 indicative of background. The objects 110 and 120 have their location spatially correlated with each other. The object 110 is referred to as a foreground object since it is closer to the viewer, and the object 120 is referred to as a background object since it is behind the object 110.

When the viewer moves toward his or her left-hand side, the images he or she will see are illustrated by the viewpoint images 10b and 10c. In the viewpoint image 10b, a hole region 130b as denoted by slash marks "I" is appeared on the left side of the object 110. The reason the holes remain in the generated images is that the original two-dimensional image does not contain the image information of the hole regions 130b and 130c. Each of the hole regions 130b and 130c is indicative of a shift in relation to its base which is the viewpoint image 10a in this example. This can be also known as parallax difference which is caused when the viewer moves his or her position. In this regard, the hole regions 130b and 130c are where the view should see behind the object 110 but their true image information are absent in the original two-dimensional image, with the result that the hole regions 130b and 130c are generated. Similarly, in the viewpoint image 10d, a hole region 130d as denoted by slash marks "/" is appeared on the right side of the object 110. In the viewpoint image 10e, a hole region 130e as denoted by slash marks "/" is appeared on the right side of the object 110.

In addition to generating holes on left and right sides in the left and right viewpoint images, among those viewpoint images shifted toward the same direction, a viewpoint image, if corresponding to a larger distance between its viewing angle and the central viewing angle, has a hole region more obvious or wider than another. For example, the viewpoint images 10b and 10c are both left viewpoint images. Between them, the viewpoint image 10b has a larger distance between its viewing angle and the central viewing angle, so that its hole region 130b is more obvious than the hole region 130c. This means that the viewpoint image 10b can be found therein more image information which is absent in the original two-dimensional image. Similar situation applies to the viewpoint images 10e and 10d. Between them, the viewpoint image 10e has a larger distance between its viewing angle and the central viewing angle, so that its hole region 130e is more obvious than the hole region 130d.

SUMMARY

According to an embodiment, an apparatus is provided for rendering three-dimensional stereoscopic images. The apparatus is for use in a three-dimensional image processing system which generates a number of viewpoint images according to an input image and an input depth. The apparatus includes an object device, a depth device, and a block filling device. The object device executes a process of object detection to output contour information according to the input image. The depth device executes a process of object judgment to output distance information according to the input depth. The block filling device detects a hole region in each viewpoint image, searches a search region adjacent to the hole region for a number of original pixels, and fills the hole region according to the original pixels, the contour information, and the distance information.

According to another embodiment, a method is provided for rendering three-dimensional stereoscopic images. The method is for use in a three-dimensional image processing system which generates a number of viewpoint images according to an input image and an input depth. The method includes a number of steps. A hole region in each of the viewpoint images is detected. A process of object detection is executed to output contour information according to the input image. A process of object judgment is detected to output distance information according to the input depth. A search region adjacent to the hole region is researched for a number of original pixels. The hole region is filled according to the original pixels, the contour information, and the distance information.

According to still another embodiment, a method is provided for rendering three-dimensional stereoscopic images. The method is for use in a three-dimensional image processing system which generates a number of viewpoint images according to an input image and an input depth. The method includes a number of steps. A continuity determination is performed, including: obtaining depth related data of a first pixel and a second pixel which are adjacent to each other on the input image according to the input depth; calculating a difference between the depth related data; and determining whether the first pixel and the second pixel are continuous according to the difference. A viewpoint image establishment is performed, including: if the first pixel and the second pixel are continuous, shifting the first pixel and the second pixel to form a shifted first pixel and a shifted second pixel, respectively, and establishing a first viewpoint image by filling an intermediate region between the shifted first pixel and the shifted second pixel according to pixel values of the shifted first pixel and the shifted second pixel. A hole region in each of the viewpoint images is detected. A process of object detection is executed to output contour information according to the input image. A process of object judgment is detected to output distance information according to the input depth. A search region adjacent to the hole region is researched for a number of original pixels. The hole region is filled according to the original pixels, the contour information, and the distance information.

According to still another embodiment, an apparatus is provided for rendering three-dimensional stereoscopic images. The apparatus is for use in a three-dimensional image processing system which generates a number of viewpoint images according to an input image and an input depth. The apparatus includes a multi-view processor, an object device, a depth device, and a block filling device. The multi-view processor obtains depth related data of a first pixel and a second pixel which are adjacent to each other on the input image according to the input depth, calculates a difference between the depth related data, and determines whether the first pixel and the second pixel are continuous according to the difference, wherein if the first pixel and the second pixel are continuous, the multi-view processor shifts the first pixel and the second pixel to form a shifted first pixel and a shifted second pixel, respectively, and establishes a first viewpoint image by filling an intermediate region between the shifted first pixel and the shifted second pixel according to pixel values of the shifted first pixel and the shifted second pixel. The object device executes a process of object detection to output contour information according to the input image. The depth device executes a process of object judgment to output distance information according to the input depth. The block filling device detects a hole region in each viewpoint image, searches a search region adjacent to the hole region for a number of original pixels, and fills the hole region according to the original pixels, the contour information, and the distance information.

The above and other aspects of the disclosure will become better understood with regard to the following detailed description of the preferred but non-limiting embodiment(s). The following description is made with reference to the accompanying drawings.

DETAILED DESCRIPTION

In order to render or inpaint hole regions of shifted viewpoint images, a number of exemplary embodiments are disclosed to illustrate an apparatus and a method for rendering three-dimensional stereoscopic images. The apparatus is provided for rendering three-dimensional stereoscopic images. The apparatus for rendering three-dimensional stereoscopic images is used in a three-dimensional image processing system which generates a number of viewpoint images according to an input image and an input depth. The apparatus for rendering three-dimensional stereoscopic images includes an object device, a depth device, and a block filling device. The object device outputs contour information according to the input image. The depth device outputs distance information according to the input depth. The block filling device detects a hole region in each viewpoint image, searches a search region adjacent to the hole region for a number of original pixels, and fills the hole region according to the original pixels, the contour information, and the distance information.

The method for rendering three-dimensional stereoscopic images is used in a three-dimensional image processing system which generates a number of viewpoint images according to an input image and an input depth. The method includes a number of steps. A hole region in each of the viewpoint images is detected. A process of object detection is executed to output contour information according to the input image. A process of object judgment is detected to output distance information according to the input depth. A search region adjacent to the hole region is researched for a number of original pixels. The hole region is filled according to the original pixels, the contour information, and the distance information.

Figure 1A:
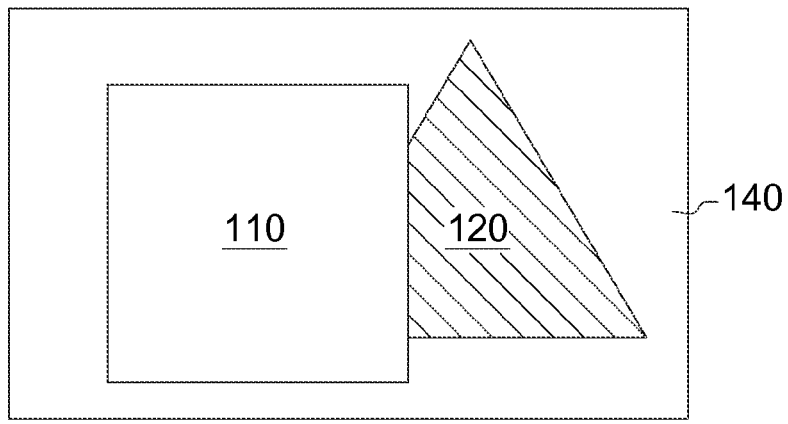
FIG. 1A is a schematic diagram showing an original viewpoint image when observed from a center position.
Figure 1B:
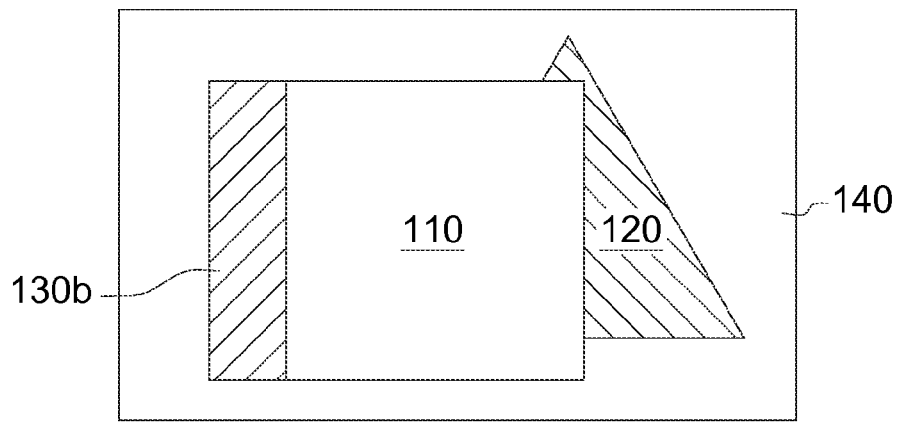
FIGS. 1B and 1C are schematic diagrams each showing a shifted viewpoint image when observed from a left position.
Figure 1C:
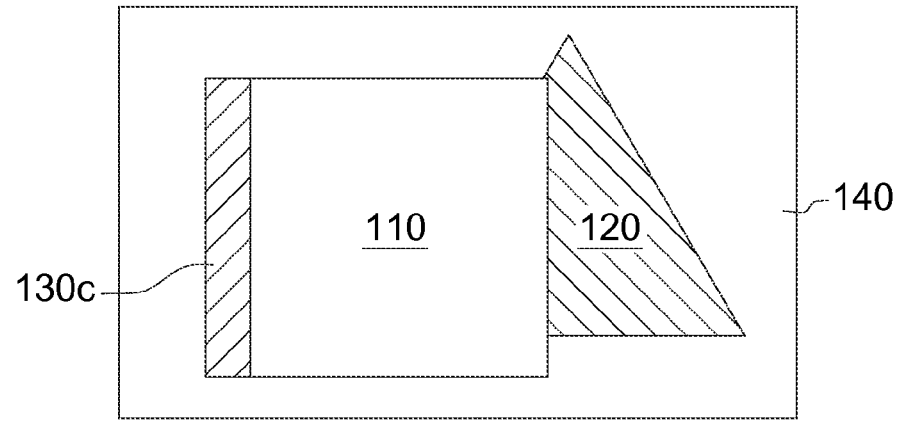
Figure 1D:
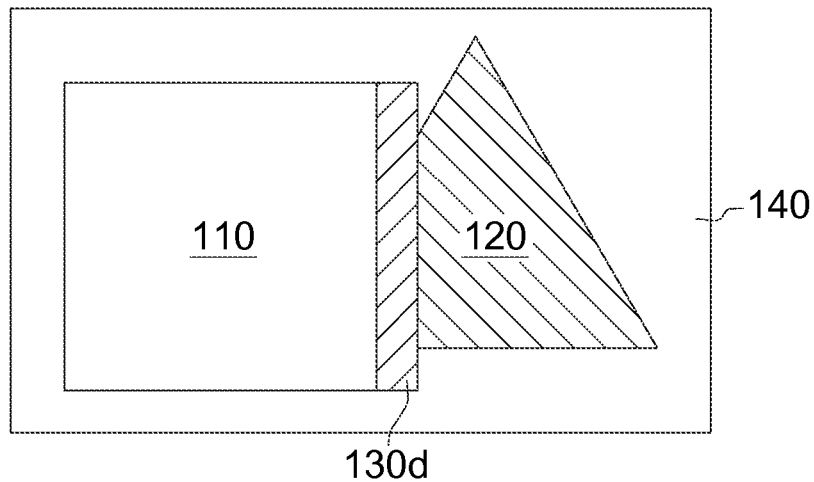
FIGS. 1D and 1E are schematic diagrams each showing a shifted viewpoint image when observed from a right position.
Figure 1E:
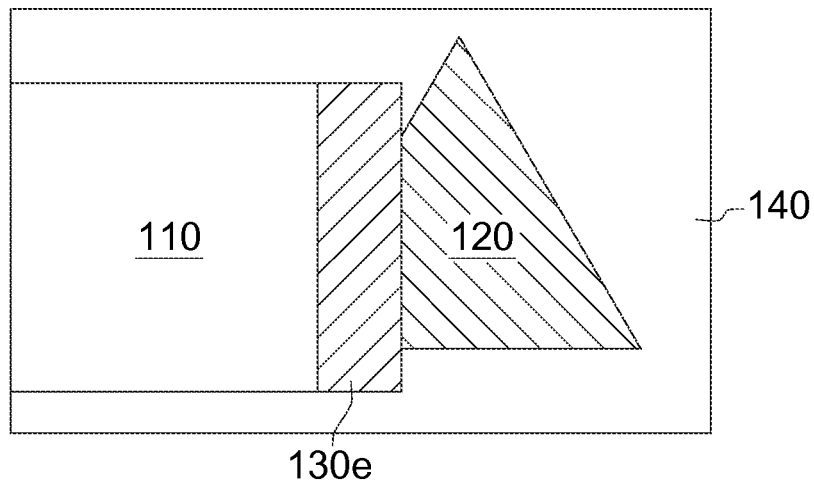
Figure 2:
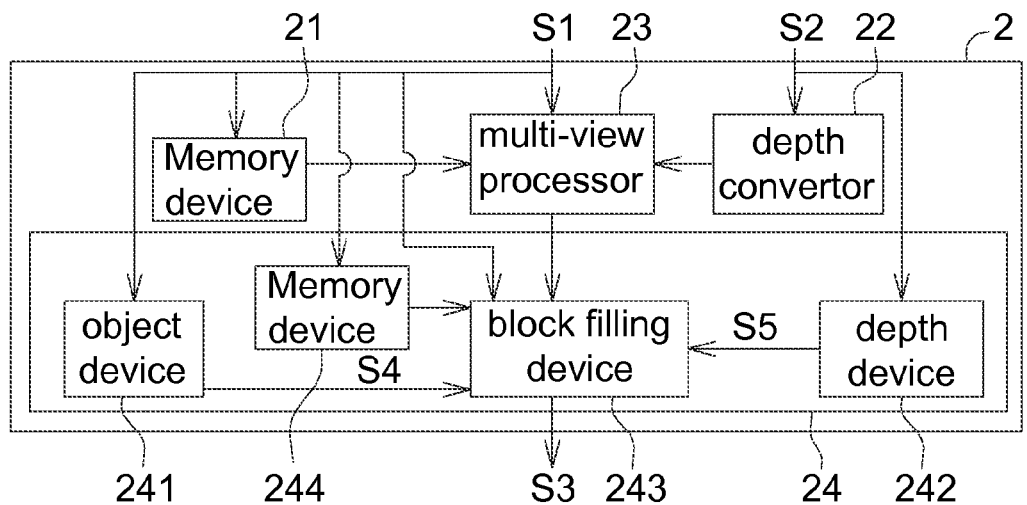
FIG. 2 is a block diagram showing an exemplary embodiment of a three-dimensional image processing system.
Figure 3:
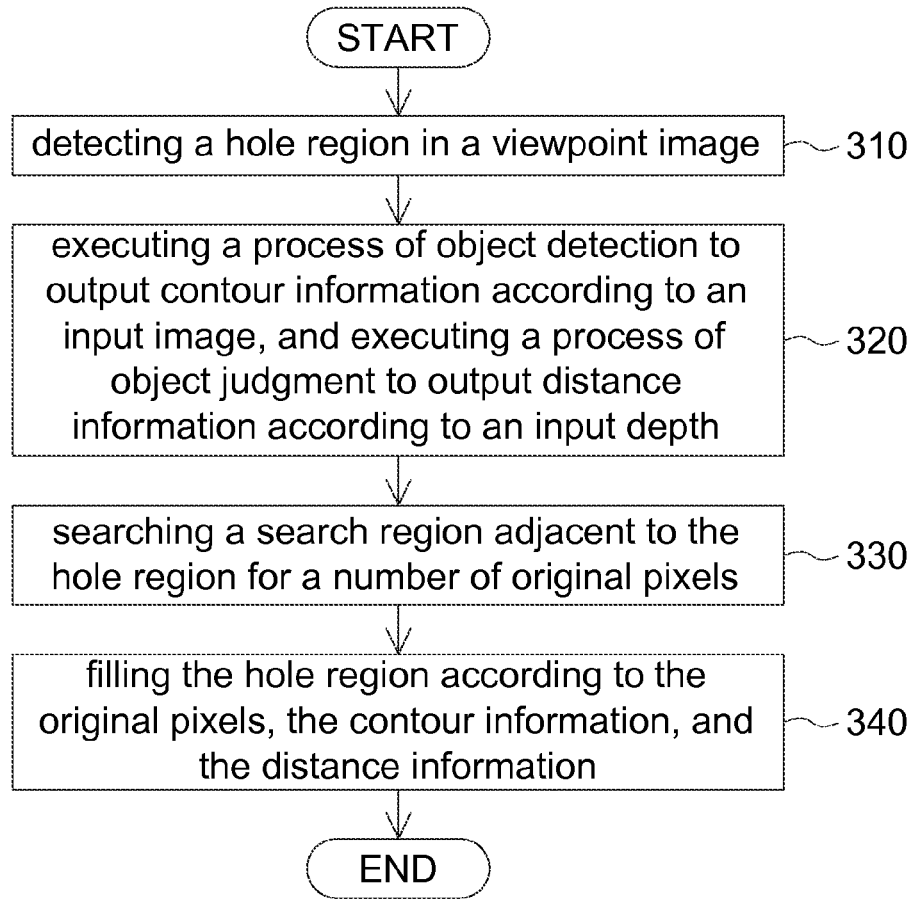
FIG. 3 is a flow chart showing a method for rendering three-dimensional stereoscopic image according to an exemplary embodiment.

Refer to both FIG. 2 and FIG. 3. FIG. 2 is a block diagram showing an exemplary embodiment of a three-dimensional image processing system. FIG. 3 is a flow chart showing a method for rendering three-dimensional stereoscopic images according to an exemplary embodiment. The three-dimensional image processing system 2 includes a memory device 21, a depth convertor 22, a multi-view processor 23, and an apparatus 24 for rendering three-dimensional stereoscopic images. The apparatus 24 includes an object device 241, a depth device 242, and a block filling device 243. The memory device 21 stores the information of an input image S1. The depth convertor 22 converts an input depth S2 into different pixel shifts according to different viewing angles, and outputs the converted results to the multi-view processor 23. Based on the pixel shifts, the multi-view processor 23 outputs a number of viewpoint images to the block filling device 243. The block filling device 243 is operated with respect to the object device 241 as well as the depth device 242 for filling hole regions in the viewpoint images, thus outputting a filled output image S3.

As to the implementation of the apparatus 24 for rendering three-dimensional stereoscopic images, its contained circuit elements such as the object device 241, the depth device 242, and the block filling device 243 each can be realized by using a processor such as a digital signal processor (DSP), or an application-specific integrated circuit (ASIC) which is designed to perform the specific operation of such device. In another embodiment, the object device 241, the depth device 242, and the block filling device 243 each can be implemented in one or more digital or analog circuit elements, or be implemented in a field-programmable gate array (FPGA). In another embodiment, the apparatus 24 for rendering three-dimensional stereoscopic images can be implemented in an ASIC or an equivalent as a whole, while some or all of its elements can be embodied as software such as a series of programs, threads, or commands which, when operated in a computer-implemented apparatus, direct the apparatus to perform specific process or operation.

For filling the hole regions in the viewpoint images, the apparatus 24 executes a method of rendering three-dimensional stereoscopic images exemplified as follows. As shown in step 310, a hole region is detected in a viewpoint image. For example, based on the input image S1 the block filling device 243 determines should a received pixel value be classified as a hole information or an image information. If the received pixel value belongs to an image information, the received pixel value is directly outputted. If the received pixel value belongs to a hole information, it will be rendered by executing subsequent steps. After discovering the hole region, the block filling device 243 records the number or location of hole pixels in the hole region, so as to facilitate the image rendering thereafter.

As shown in step 320, the object device 241 executes a process of object detection to output contour information S4 according to the input image S1. The depth device 242 executes a process of object judgment to output distance information S5 according to the input depth S2. The contour information S4 is for example edges of the object which the object device 241 extracts from the input image S1 when applying edge detection thereto. The distance information S5 is for example distances between objects and background or distances among objects which the depth device 242 retrieves from the input depth S2. The aforementioned process of object detection which object device 241 performs on the input image S1 is, for example, implemented as using an object's edges to separate or distinguish from the object and the background. Because the object device 241 is unable to provide the distances between objects and background or distances among objects, the depth device 242 is used to collaborate in performing on the input depth the process of object judgment. It can be found that the objects corresponding to similar depths have approximate pixel values. Thus, in order for the hole region to be filled thereafter, the object device 241 can collaborate with the depth device 242 to provide the block filling device 243 with the contour information S4 and the distance information S5.

As shown in step 330, the block filling device 243 searches a search region adjacent to the hole region for a number of original pixels. In an embodiment, the apparatus 24 can, for example, further include a block buffer for temporarily storing original pixel values of the aforementioned original pixels. The research region can be exemplarily implemented as having a predefined range, or a range dynamically varied with the number of hole pixels in the hole region.

As shown in step 340, the block filling device 243 fills the hole region according to the original pixels, the contour information S4, and the distance information S5. According to the original pixels, the contour information S4, and the distance information S5, the block filling device 243 can classify as an object or a background each hole pixel in the hole region. As such, the block filling device 243 can fill a hole pixel of the hole region with a background pixel value or an object pixel value. Specifically, the aforementioned method for rendering three-dimensional stereoscopic images can further be embodied in different modes, such as a mode with memory device and a mode without memory device, description of which is provided as follows.

Figure 4A:
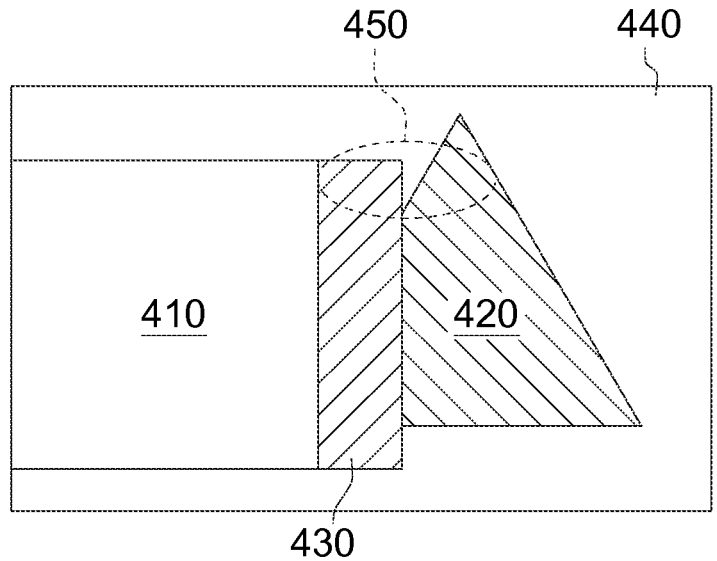
FIG. 4A is a schematic diagram showing a viewpoint image where a hole is generated after the shift of the input image.
Figure 4B:
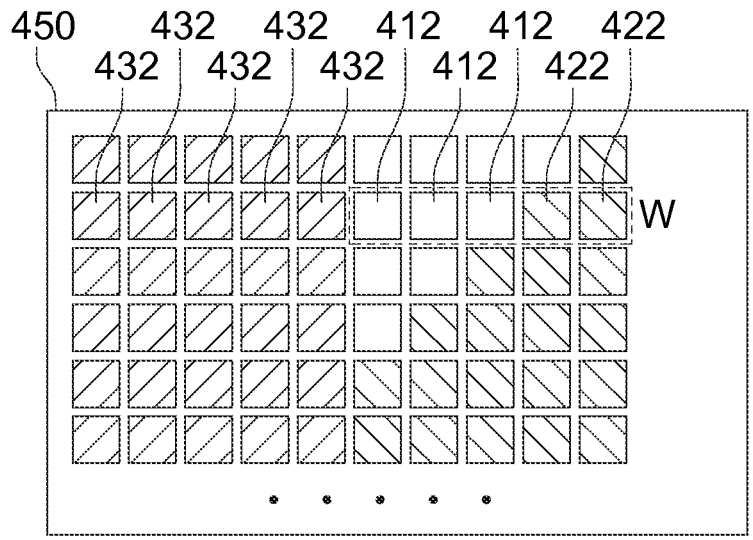
FIG. 4B is a partially enlarged diagram showing a selected portion 450 in FIG. 4A.
Figure 4C:
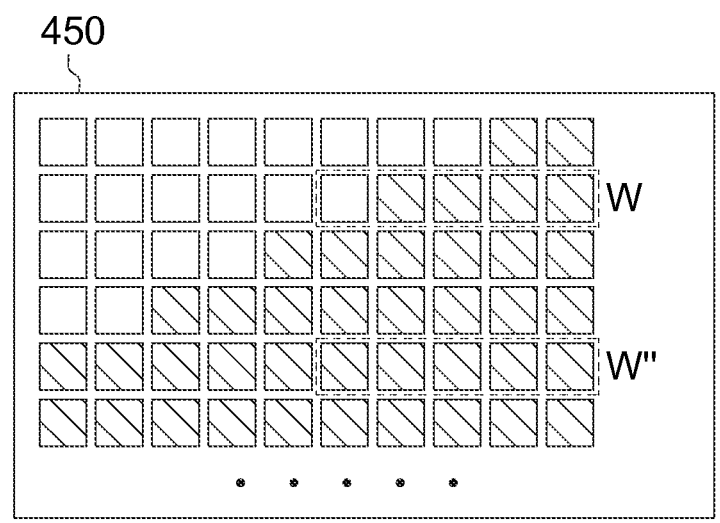
FIG. 4C is a partially enlarged diagram showing the selected portion in FIG. 4B where the hole region is filled by proportionate expansion.
Figure 4D:
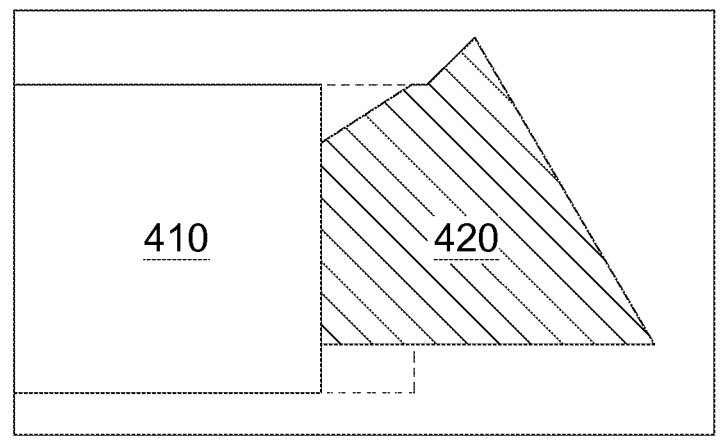
FIG. 4D is a schematic diagram showing a viewpoint image in FIG. 4A where the hole region is filled by proportionate expansion.

Refer to FIGS. 4A, 4B, 4C, and 4D. FIG. 4A is a schematic diagram showing a viewpoint image where holes are generated after the shift of the input image. FIG. 4B is a partially enlarged diagram showing a selected portion 450 in FIG. 4A. FIG. 4C is a partially enlarged diagram showing the selected portion in FIG. 4B where the hole region is filled by proportionate expansion. FIG. 4D is a schematic diagram showing a viewpoint image in FIG. 4A where the hole region is filled by proportionate expansion. For example, the original viewpoint image 4a has the selected portion 450 partially enlarged as a partial viewpoint image 4b. When having detected a number of hole pixels 432 in the hole region 430 of the original viewpoint image 4a, the aforementioned block filling device 243 determines whether each original pixel in the search region W belongs to an object 420 or a background 440. An original pixel being determined as the object 420 is referred to as an object pixel 422, while an original pixel being determined as the background 440 is referred to as a background pixel 412. In an embodiment, the original pixels in the search region W correspond to an object-background ratio which is indicative of the ratio between the numbers of the object pixels and the background pixels. As shown in FIG. 4B, exemplarily, there are two object pixels 422 and three background pixels 412 in the search region W, which correspond to an object-background ratio of 2:3. In other words, the object-background ratio of 2:3 means a composition of two object pixel values and three background pixel values can be found in five original pixel values.

According to the object-background ratio, the block filling device 243 proportionately expands the five original pixel values which contain two object pixel values and three background pixel values in a manner of filling the hole pixels 432, the object pixels 422, and the background pixels 412 in FIG. 4B. In this way of rendering, the generated result is a partial viewpoint image 4c shown in FIG. 4C. After being rendered by proportionate expansion, the original viewpoint image 4a in FIG. 4A is converted into a filled viewpoint image 4d in FIG. 4D. The number of the hole pixels 432 and the size of the search region W are associated with the performance of image rendering. When the search region is larger, better performance of image rendering can be obtained while a larger amount of data is required to be temporally stored. Correspondingly, when the search region is smaller, minor performance of image rendering can be obtained while a smaller amount of data is required to be temporally stored. In addition to the aforementioned embodiment where the hole region is filled by proportionate expansion, in other embodiments, the block filling device 243 can fill hole pixels of the hole region according to an average value of the original pixel values. In another embodiments, the block filling device 243 can fill the hole pixels of the hole region by duplicating the original pixel values, or fill the hole pixels of the hole region by duplicating a computation result of the original pixel values.

Figure 5A:
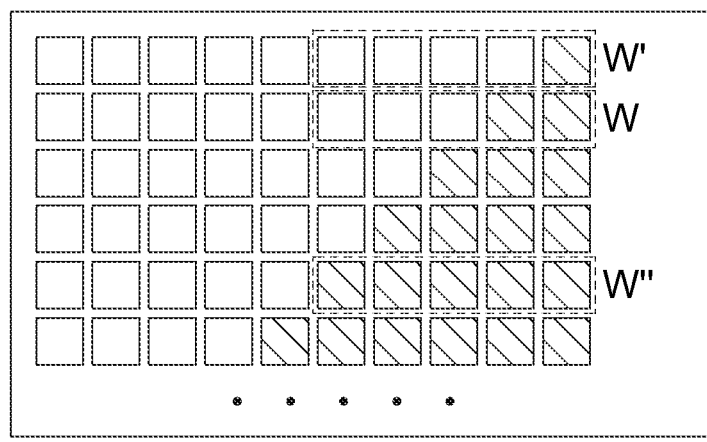
FIG. 5A is a schematic diagram showing the selected portion in FIG. 4B where the hole region is filled by using a variation criteria of the object.
Figure 5B:
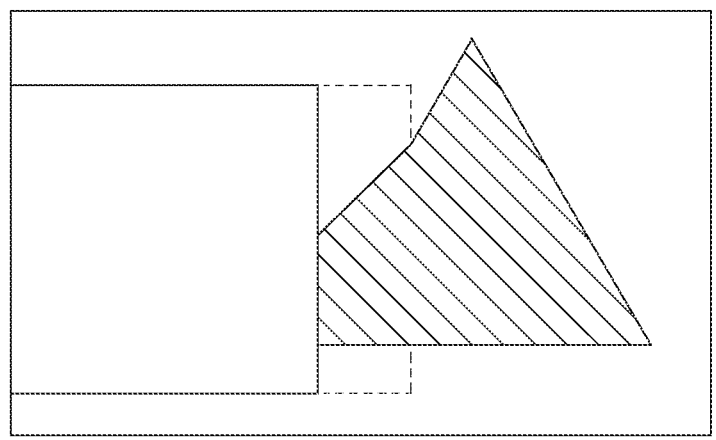
FIG. 5B is a schematic diagram showing a viewpoint image in FIG. 4A where the hole region is filled by using the variation criteria of the object.

Refer to both FIG. 5A and FIG. 5B. FIG. 5A is a schematic diagram showing the selected portion in FIG. 4B where the hole region is filled by using a variation criteria of the object. FIG. 5B is a schematic diagram showing a viewpoint image in FIG. 4A where the hole region is filled by using the variation criteria of the object. The apparatus 24 for rendering three-dimensional stereoscopic images can further include a memory device 244 for storing reference pixel values. The reference pixel values in a following embodiment are exemplified as being located at an upper row of the original pixels, but this disclosure is not limited thereto. The memory device 244, also, can be used to store another one or more rows of pixel values, and serve them the reference pixel values. The reference pixel values correspond to a number of reference pixels, respectively. For example, as shown in FIG. 5A, the reference pixels are located in the search region W'. From the reference pixels in the search region W' and the original pixels in the search region W, the block filling device 243 can determine a variation criteria of the object, and fills the hole pixels according to the variation criteria. In other embodiments, the aforementioned memory device 244 can further include the block buffer which is for temporarily storing the aforementioned original pixel values of the original pixels.

In the mode with memory, the block filling device 243 applies, for example, an upper row of reference pixels to determining the required pixel values of the hole pixels. As shown in FIG. 5A, from the search regions W' to W, the number of background pixels is changed from four to three, while the number of object pixels is changed from one to two. From the variation criteria of the object, the block filling device 243 can derive that the number of the object pixels is increasing regularly. Au such, when rendering pixels on the left side of the search region W in FIG. 4B, the block filling device 243 fills the five hole pixels 432 by extending the background pixel values of the three background pixels 412 in the search region W. By using the variation criteria of the object in image rendering, the filled image can be the one shown in FIG. 5B. Besides, in other embodiments, the block filling device 243 can also apply reference pixels in the search region W' and an object-background ration in the search region W to filling the hole pixels and the original pixels by proportionate expansion. Moreover, in other embodiments, the block filling device 243 can apply the reference pixels to filling the hole pixels by duplicating the original pixels.

In some cases, although the multi-view processor 23 may output viewpoint images according to existing pixel shifting algorithms, errors may occur if the pixel shifting algorithm is performed without considering the continuous information of an object.

Figure 6A:
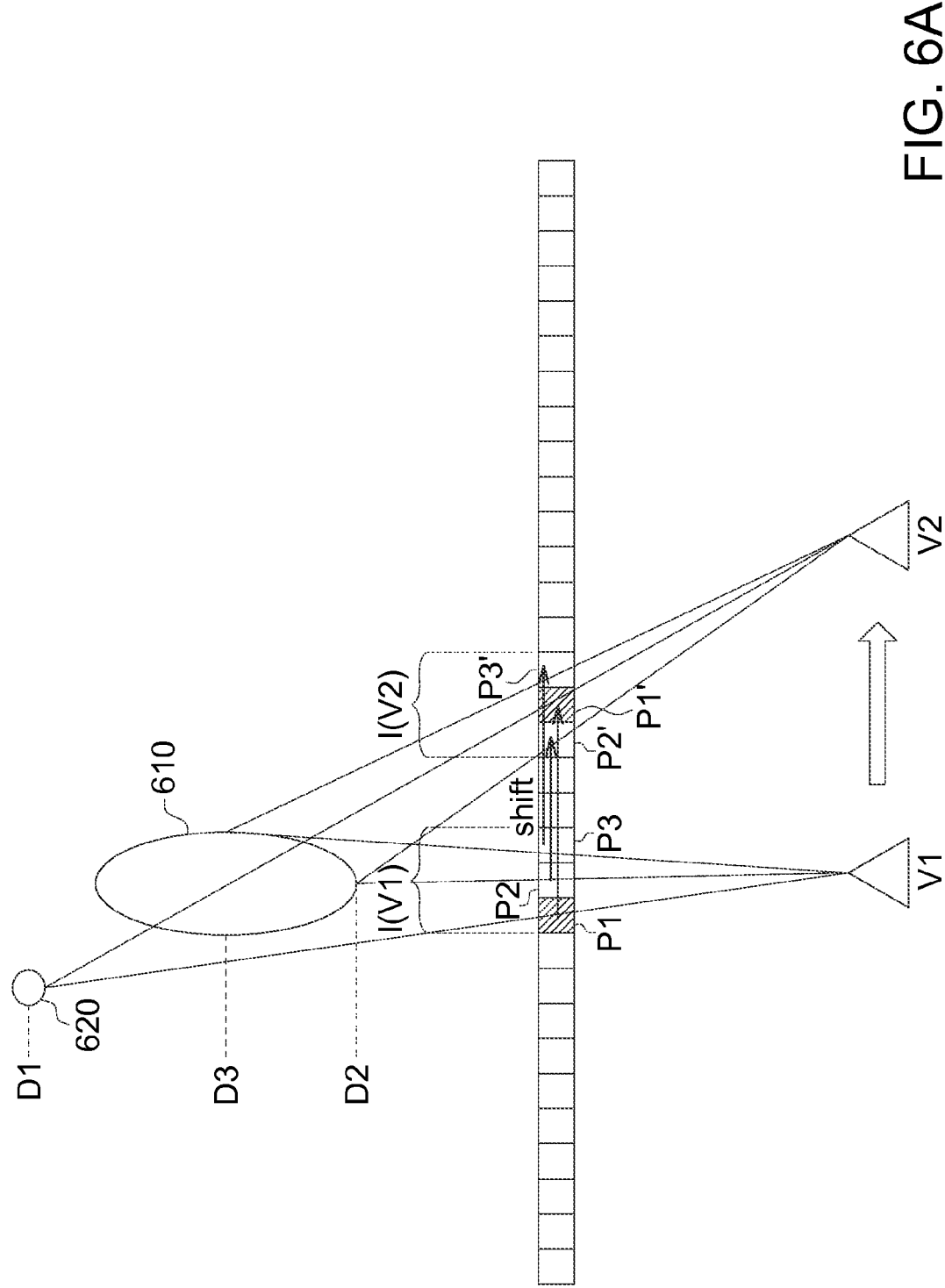
FIG. 6A is an example for illustrating the continuous issue.

FIG. 6A is an example for illustrating the abovementioned continuous issue. In the example of FIG. 6A, two objects 610 and 620 with different colors are photographed at the view angle V1, and three pixels P1, P2 and P3 are formed on the viewpoint image I(V1), wherein the pixel P1 is corresponding to the photographed object 620, and the pixels P2 and P3 are corresponding to the photographed object 610. If the pixel shifting algorism is performed without considering the continuous information of an object, in some cases, the pixel P1 may be shifted to the spacing between the shifted pixels P2' and P3', as shown in FIG. 6A. Thus, for the viewpoint image I(V2) estimated from the view angle V2, shifting errors may occur because the shifted pixels P2' and P3', which are corresponding to the continuous object 610, is interleaved by the shifted pixel P1' which is corresponding to the object 620.

Figure 6B:
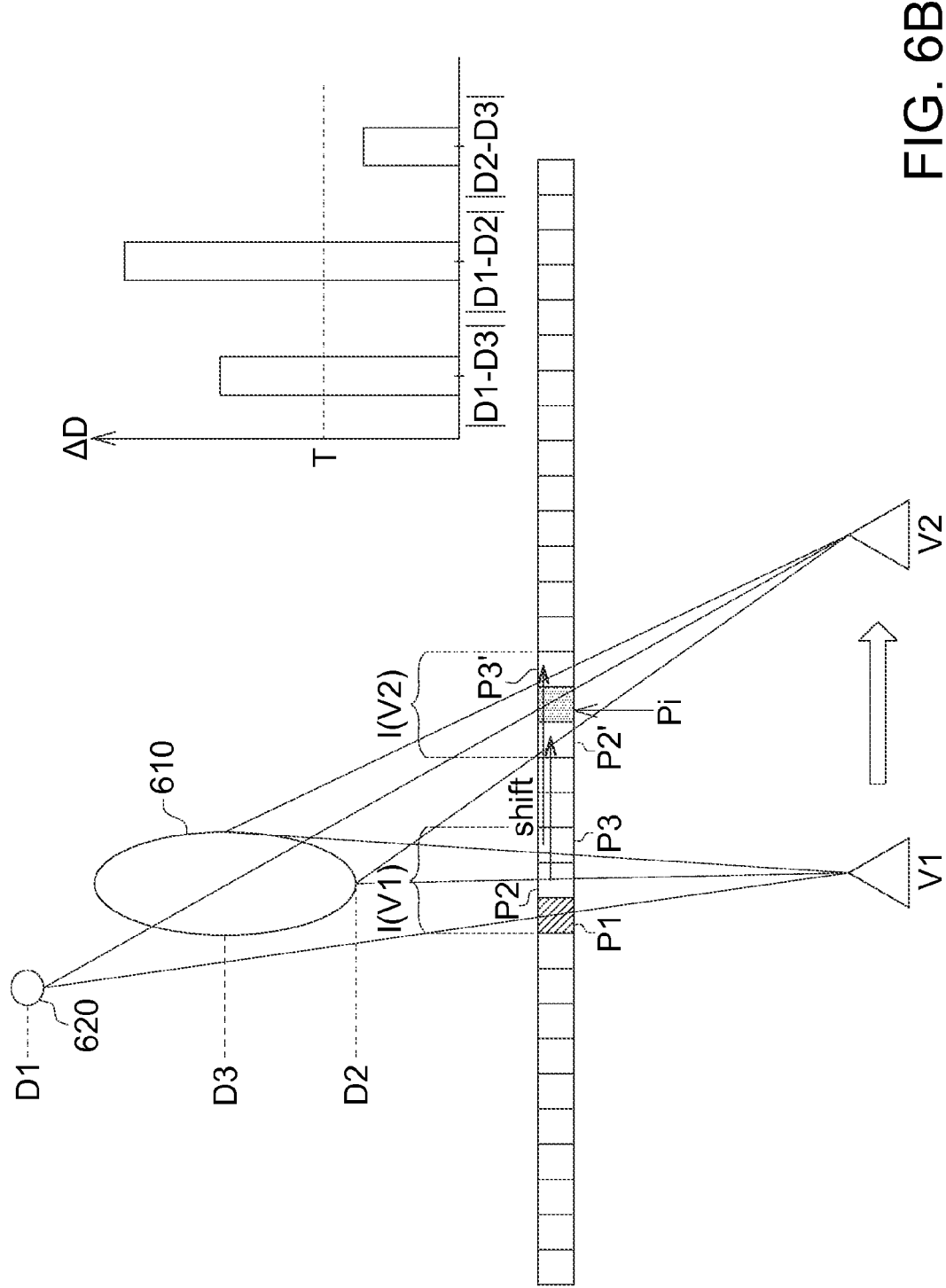
FIG. 6B illustrates an exemplary viewpoint image established with the continuous information of an object.

FIG. 6B illustrates an exemplary viewpoint image established with the continuous information of an object. In one embodiment, the continuous information of an object can be obtained from the depth related data of the pixels, wherein the depth related data can be represented by the depth values of the pixels, the disparity between the pixels (e.g., the shifting amount between a pixel and a shifted pixel in a predetermined direction), or the combination thereof. Generally, the depth value is inversely proportional to the disparity value. Taking the depth values as an example, if the difference of the depth values between two adjacent pixels is less than or equal to a threshold, the two adjacent pixels can be considered to be continuous and correspond to a continuous object; otherwise, it may consider that the two adjacent pixels do not have a continuity relationship between them and the intermediate region (if existing, after the pixel shifting) between these two pixels is allowed to be interleaved by other pixels which correspond to another photographed object, as shown in FIG. 6A.

In the example of FIG. 6B, the difference (ΔD) between the depth related data D2, D3 of the pixels P2 and P3 is less than the threshold T while the difference between the depth related data D1 and D2, or D1 and D3, is larger than the threshold T. Thus, the pixels P2 and P3 can be regarded as a set of continuous pixels. In order to extend the visual continuity between the shifted continuous pixels, the values of the intermediate pixels between the shifted continuous pixels can be determined by the values thereof. As shown in FIG. 6B, for the viewpoint image I(V2) with respect to the view angle V2, the intermediate pixel Pi has a pixel value of the weighted sum of the two shifted continuous pixels P2' and P3' (e.g., PV(Pi)=½*PV(P2')+½*PV(P3'), where the term PV(Pi) indicates the pixel value of the intermediate pixel Pi, and the terms PV(P2') and PV(P3') indicate the pixel values of the shifted continuous pixels P2' and P3', respectively).

Figure 7:
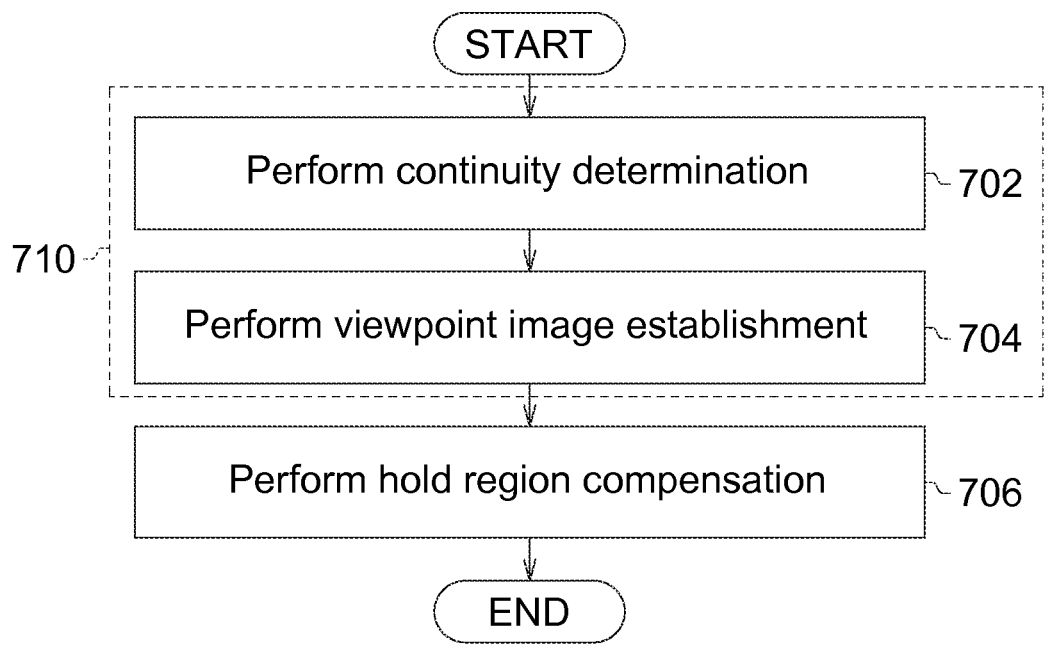
FIG. 7 illustrates a flowchart 700 for rendering three-dimensional stereoscopic images according to one embodiment of the present invention.

FIG. 7 illustrates a flowchart 700 for rendering three-dimensional stereoscopic images according to one embodiment of the present invention. The flowchart 700 mainly comprises a continuity calibration procedure 710 which includes the following steps:

Step 702: the multi-view processor 23 may perform continuity determination to check if two adjacent pixels are continuous; and Step 704: the multi-view processor 23 may perform viewpoint image establishment base on the determination result of step 702.

After the continuity calibration procedure 710 is done, the multi-view processor 23 may perform the hold region compensation at step 706. In one embodiment, step 706 can be implemented by the flowchart 300 and thus detail descriptions of step 706 are omitted herein.

Figure 8:
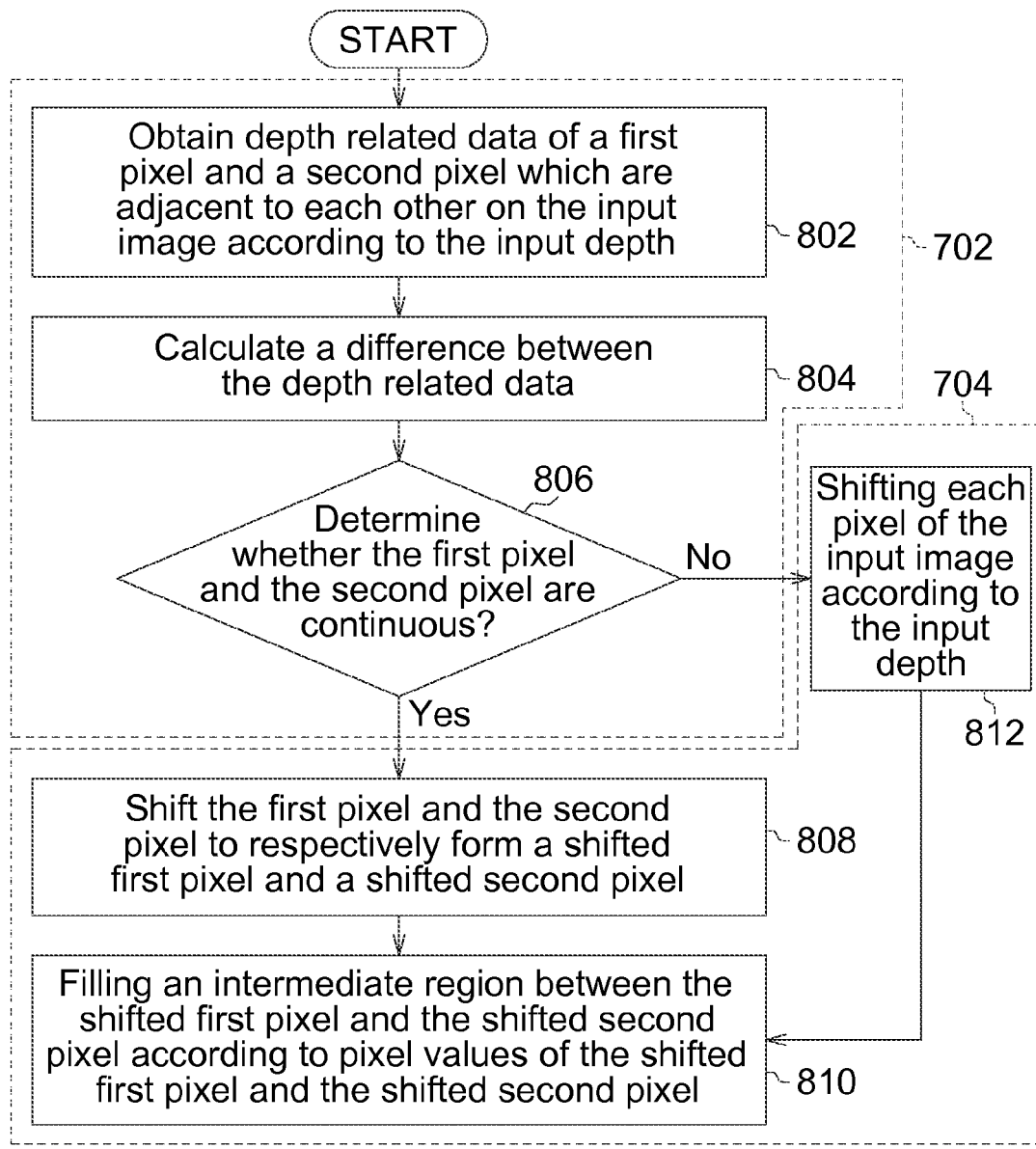
FIG. 8 illustrates detail steps of the continuity calibration procedure according to one embodiment of the present invention.

Along with FIGS. 2 and 7, please refer to FIG. 8, which illustrates detail steps of the continuity calibration procedure 710 according to one embodiment of the present invention. As shown in FIG. 8, the continuity determination (step 702) may include the following steps:

Step 802: the multi-view processor 23 may obtain depth related data of a first pixel and a second pixel which are adjacent to each other on the input image S1 according to the input depth S2;

Step 804: the multi-view processor 23 may calculate a difference between the depth related data; and Step 806: the multi-view processor 23 may determine whether the first pixel and the second pixel are continuous according to the difference.

Afterwards, the multi-view processor 23 may perform the viewpoint image establishment procedure (step 704) according to the determination result of step 806. As shown in FIG. 8, if the first pixel and the second pixel are continuous, the multi-view processor 23 may shift the first pixel and the second pixel to respectively form a shifted first pixel and a shifted second pixel (step 808), and then establish a viewpoint image by filling an intermediate region between the shifted first pixel and the shifted second pixel according to pixel values of the shifted first pixel and the shifted second pixel (step 810); otherwise, if the first pixel and the second pixel are not continuous, the multi-view processor 23 may establish the viewpoint image by shifting each pixel of the input image S1 according to the input depth S2 (step 812).

Figures 9, 10:
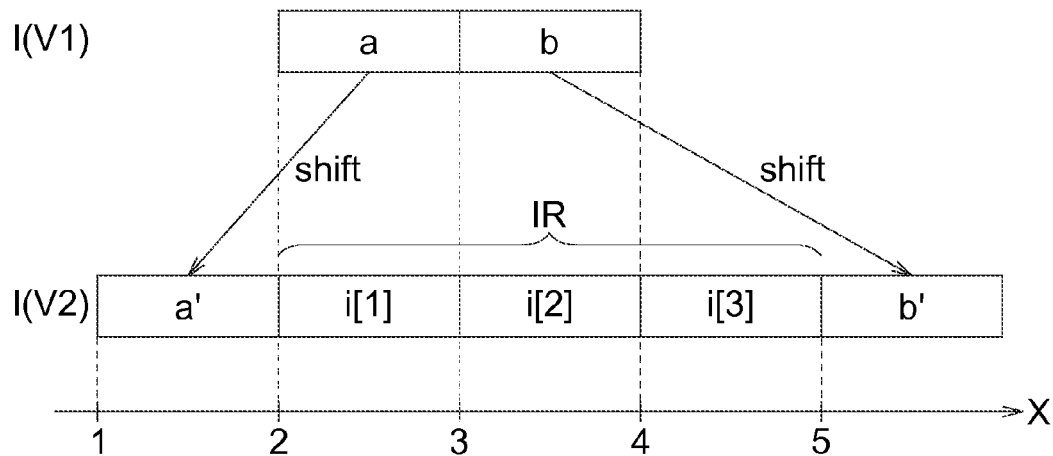
FIG. 9 illustrates an example of establishing a viewpoint image by the filling of an intermediate region.
FIG. 10 illustrates exemplary arrangements of the intermediate pixels.

For better illustration of the proposed continuity calibration procedure, please refer to FIG. 9, which illustrates an example of establishing a viewpoint image by the filling of an intermediate region.

In the example FIG. 9, "I(V1)" represents the viewpoint image in respect to the view angle V1, "I(V2)" represents the viewpoint image in respect to the view angle V2, "x" represents pixel locations on the viewpoint images, "a" and "b" represent pixels on the viewpoint images, and "i[1]" to "i[3]" represent the intermediate pixels included in the intermediate region IR. For the viewpoint image I(V1), the pixels a and b are adjacent to each other. Assume that the pixels a and b are shifted to the locations x=1 and x=5, respectively. The spacing between the shifted pixels a' and b' can be defined as an intermediate region IR, which may comprise one or more intermediate pixels (e.g., intermediate pixels i[1] to i[3]). Base on the proposed continuity calibration procedure, the intermediate pixels may include:

1. combination (e.g., linear combination) of the shifted pixels a and b, if the shifted pixels a and b are continuous; or
2. pixels shifted from other pixel locations, if the shifted pixels a and b are not continuous.

For the continuous case, even though two continuous pixels (a and b) may become separated from each other after pixel shifting, visual continuity can still be maintained, and thus the shifting errors caused by the loss of the continuity information of an object can be avoided.

Along with FIG. 9, please refer to FIG. 10, which illustrates exemplary arrangements of the intermediate pixels. As mentioned earlier, for two continuous pixels (referred to as first and second pixels herein), the intermediate region IR of a viewpoint image may include at least one intermediate pixel, and the pixel value of the at least one intermediate pixel can be determined by a weighted sum of the pixel values of the shifted first pixel and the shifted second pixel. In the example of FIG. 10, the pixel value of an intermediate pixel can be express by:

$$PV(i[n])=k*PV(a)+(1-k)PV(b)$$

where the term "PV(i[n])" indicates the pixel value of an intermediate pixel i[n]; the term "PV(a)" indicates the pixel value of the first pixel a (one of the two continuous pixels); the term "PV(b)" indicates the pixel value of the second pixel b (the other one of the two continuous pixels); n is an integer for numbering the intermediate pixel; and k is a weighting coefficient between 0 and 1.

As shown in FIG. 10, if k=1, then the pixel values of the intermediate pixels i[1] to i[3] are all equal to PV(a); if k=0, then the pixel values of the intermediate pixels i[1] to i[3] are all equal to PV(b); if k=1 for n=1 and k=0 for n=2 and 3, then the pixel values of the intermediate pixels i[1] to i[3] are equal to PV(a), PV(b) and PV(b), respectively; if k=½, then the pixel values of the intermediate pixels i[1] to i[3] are all equal to PV(a)/2+PV(b)/2; if k=¾, then the pixel values of the intermediate pixels i[1] to i[3] are all equal to ¾*PV(a)+¼*PV(b), etc. It is understood that the present invention is not limited to the above examples. In some embodiments, the pixel value of an intermediate pixel can be chosen by other ways to fit practical needs, as long as such pixel value is obtained from the linear/non-linear combination of the continuous pixels.

In one embodiment, the multi-view processor 23 may perform an anti-aliasing procedure to further improve the quality of a viewpoint image. The anti-aliasing procedure can be performed independently or in conjunction with the abovementioned hold region compensation and/or continuity calibration procedure.

Figure 11:
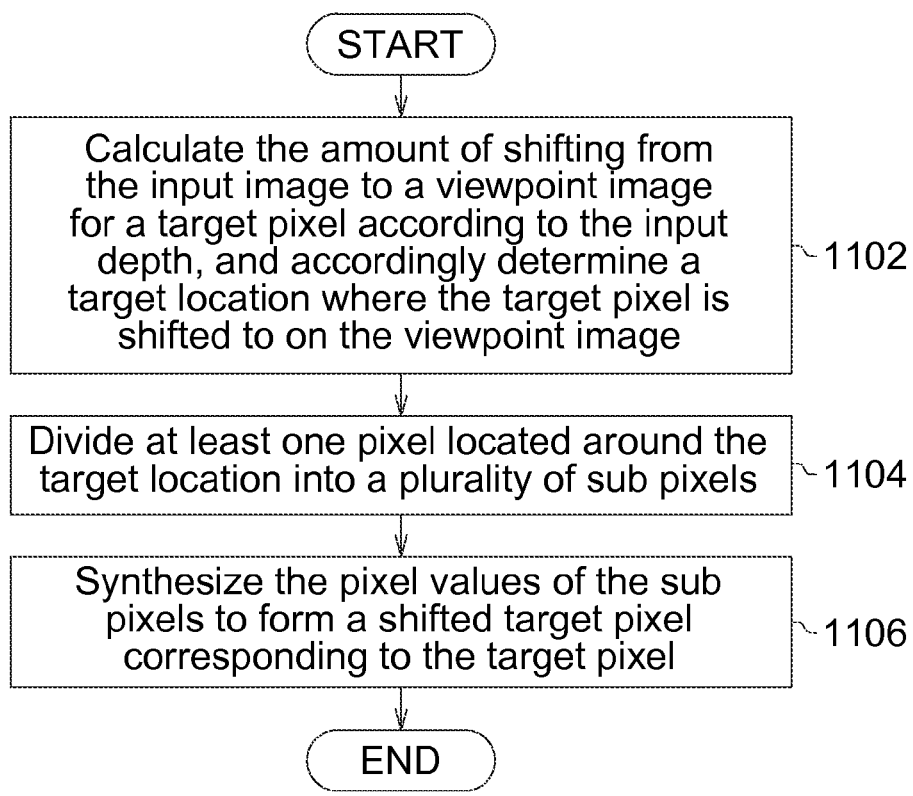
FIG. 11 illustrates a flowchart of the anti-aliasing procedure according to one embodiment of the present invention.

FIG. 11 illustrates a flowchart 1100 of the anti-aliasing procedure according to one embodiment of the present invention. The flowchart 1100 includes the following steps:

Step 1102: the multi-view processor 23 may calculate the amount of shifting from the input image S1 to a viewpoint image for a target pixel according to the input depth S2, and accordingly determine a target location where the target pixel is shifted to on the viewpoint image;

Step 1104: the multi-view processor 23 may divide at least one pixel located around the target location into a plurality of sub pixels; and Step 1106: the multi-view processor 23 may synthesize the pixel values of the sub pixels to form a shifted target pixel corresponding to the target pixel.

As a brief summary of the anti-aliasing procedure, the multi-view processor 23 may virtually increase the resolution of pixels when shifting a target pixel. Therefore, truncation errors, which are caused by dropping the trailing digits of a shifting number, can be significantly reduced, and undesired jagged edges of the object outline can then be smoothed.

Figure 12:
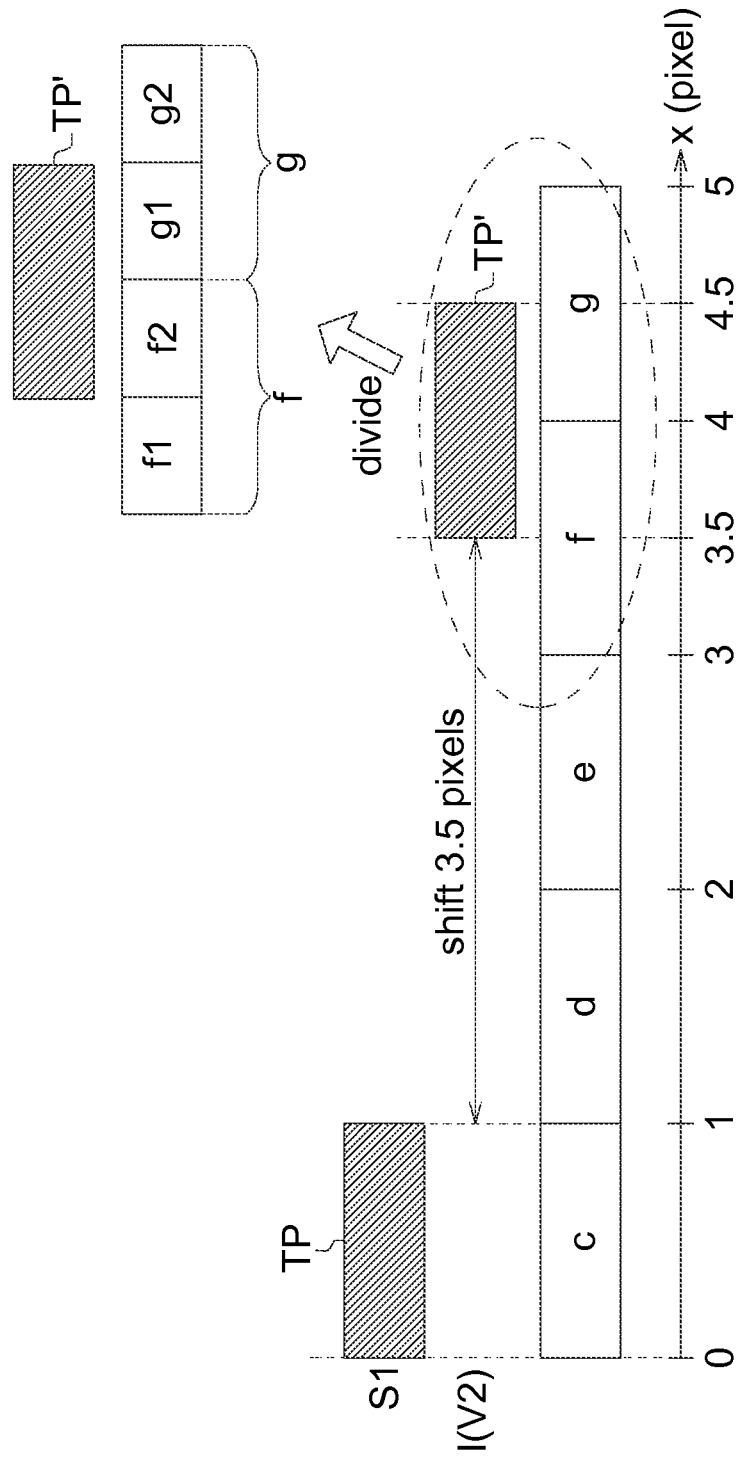
FIG. 12 is an example for illustrating the anti-aliasing procedure according to one embodiment of the present invention.

FIG. 12 is an example for illustrating the anti-aliasing procedure according to one embodiment of the present invention. In the example of FIG. 12, "c", "d", "e", "f" and "g" represent pixels located at the image locations x=0, x=1, x=2, x=3 and x=4, respectively; "TP" represents the target pixel to be shifted; and "TP'" represents the shifted target pixel. Assume that the amount of shifting from the input image S1 to the viewpoint image I(V2) for the target pixel TP is a non-integer multiple of pixel, e.g., 3.5 pixels. The target pixel TP, which is originally defined on the pixel c, should be shifted to the location x=3.5 without truncating the fractional part of the shifting amount, and thus the shifted target pixel TP' in defined on the pixels f and g. In order to form the shifted target pixel TP' on the pixels f and g, the multi-view processor 23 may divide the pixels f and g into a plurality of sub pixels (e.g., f1, f2, g1 and g2), and then synthesize the pixel values of the sub pixels to form the shifted target pixel TP'. For example, the multi-view processor 23 may utilize linear/non-linear combination, interpolation, or other algorithms to synthesize the pixel values of the sub pixels to form the shifted target pixel.

Figure 13:
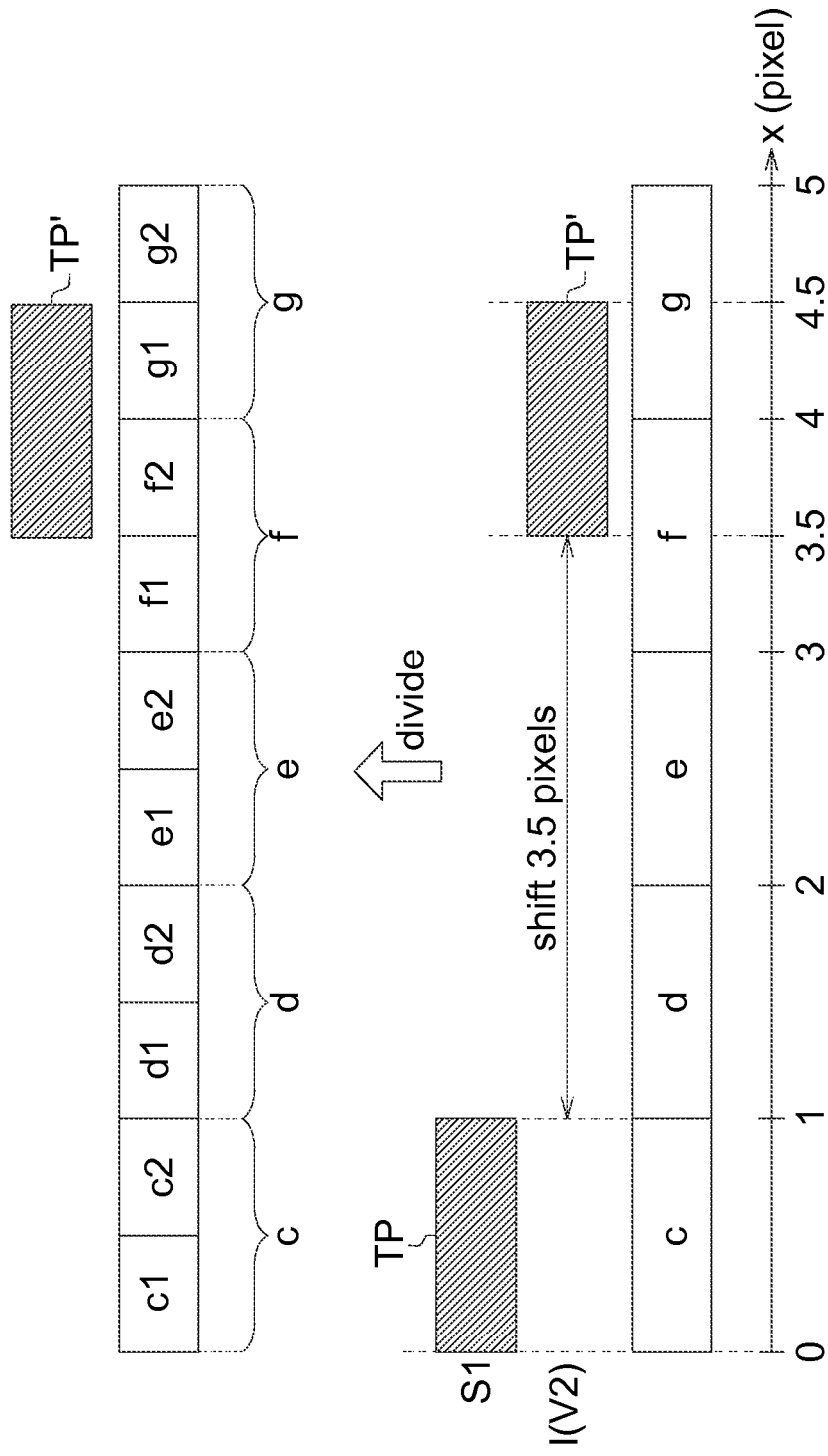
FIG. 13 is an example for illustrating the anti-aliasing procedure according to another embodiment of the present invention.

FIG. 13 is an example for illustrating the anti-aliasing procedure according to another embodiment of the present invention. The main difference between FIG. 13 and FIG. 12 is that the multi-view processor 23 may divide each pixel (c, d, e, f and g) into sub pixels (c1, c2, d1, d2, e1, e2, f1, f2, g1 and g2) when shifting the target pixel TP. As shown in FIG. 13, the resolution of the pixels is increased to twice its original resolution after the pixel division. Understandably, the present disclosure is not limited to the above examples. In some embodiments, the multi-view processor 23 may divide each pixel into 4, 8, or other number of sub pixels, according to practical needs.

As mentioned above, a number of embodiments are exemplified for illustration of the present disclosure. As long as there are cases where the block filling device can fill the hole region according to the contour information of the object device and the distance information of the depth device, they are also regarded as practicable and feasible embodiments of the disclosure, and the claimed subject matter will reach them.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for rendering three-dimensional stereoscopic images, the apparatus being used in a three-dimensional image processing system, the three-dimensional image processing system generating a plurality of viewpoint images according to an input image and an input depth, the apparatus comprising:
    a multi-view processor for obtaining depth related data of a first pixel and a second pixel which are adjacent to each other on the input image according to the input depth, calculating a difference between the depth related data, and determining whether the first pixel and the second pixel are continuous according to the difference, wherein if the first pixel and the second pixel are continuous, the multi-view processor shifts the first pixel and the second pixel to form a shifted first pixel and a shifted second pixel, respectively, and establishing a first viewpoint image by filling an intermediate region between the shifted first pixel and the shifted second pixel according to pixel values of the shifted first pixel and the shifted second pixel;
    an object device, executing a process of object detection to output contour information according to the input image;
    a depth device, executing a process of object judgment to output distance information according to the input depth; and
    a block filling device, detecting a hole region in each of the viewpoint images, searching a search region adjacent to the hole region for a number of original pixels, filling the hole region according to the original pixels, the contour information, and the distance information.

2. The apparatus according to claim 1, wherein the block filling device classifies as an object or a background each of a plurality of hole pixels in the hole region according to the original pixels, the contour information, and the distance information.

3. The apparatus according to claim 1, wherein the block filling device fills a plurality of hole pixels of hole region and the original pixels by proportionately expanding a plurality of original pixel values of the original pixels according to an object-background ratio of the original pixels.

4. The apparatus according to claim 1, wherein the block filling device fills a plurality of hole pixels of the hole region according to an average value of a plurality of original pixel values of the original pixels.

5. The apparatus according to claim 1, wherein the block filling device fills a plurality of hole pixels of the hole region by duplicating a plurality of original pixel values of the original pixels, or fills the hole pixels of the hole region by duplicating a computation result of the original pixel values.

6. The apparatus according to claim 1, further comprising:
    a memory device configured to store a plurality of reference pixel values, the reference pixel values respectively corresponding to a plurality of reference pixels, the reference pixels being adjacent to the original pixels.

7. The apparatus according to claim 6, wherein the block filling device determines a variation criteria of the object from the reference pixels and the original pixels, and fills a plurality of hole pixels of the hole region according to the variation criteria.

8. The apparatus according to claim 6, wherein the block filling device applies the reference pixels to filling a plurality of hole pixels of hole region and the original pixels by proportionately expanding a plurality of original pixel values of the original pixels according to an object-background ratio of the original pixels.

9. The apparatus according to claim 6, wherein the block filling device applies the reference pixels to filling a plurality of hole pixels of the hole region by duplicating a plurality of original pixel values of the original pixels.

10. The apparatus according to claim 6, wherein the memory device further comprises:
a block buffer configured to temporally store a plurality of original pixel values of the original pixels.

11. The apparatus according to claim 1, wherein the research region has a range dynamically varied with the number of hole pixels in the hole region.

12. The apparatus according to claim 1, wherein the search region has a predefined range.

13. The apparatus according to claim 1, wherein the first pixel and the second pixel are continuous if the difference is smaller than a threshold.

14. The apparatus according to claim 1, wherein if the first pixel and the second pixel are not continuous, the multi-view processor establishes a second viewpoint image by shifting each pixel of the input image according to the input depth.

15. The apparatus according to claim 1, wherein the intermediate region of the first viewpoint image includes at least one intermediate pixel, and pixel value of the at least one intermediate pixel is determined by a weighted sum of the pixel values of the shifted first pixel and the shifted second pixel.

16. The apparatus according to claim 1, wherein the multi-view processor further performs an anti-aliasing procedure, including:
calculating amount of shifting from the input image to a third viewpoint image for a third pixel according to the input depth, and accordingly determining a target location where the third pixel is shifted to on the third viewpoint image; and
dividing at least one pixel located around the target location into a plurality of sub pixels.

17. The apparatus according to claim 16, wherein the multi-view processor synthesizes pixel values of the sub pixels to form a shifted third pixel corresponding to the third pixel.

18. The apparatus according to claim 17, wherein the amount of shifting for the third pixel is a non-integer multiple of pixel.

19. A method for rendering three-dimensional stereoscopic images, the method being used in a three-dimensional image processing system, the three-dimensional image processing system generating a plurality of viewpoint images according to an input image and an input depth, the method comprising:
performing a continuity determination, including:
obtaining depth related data of a first pixel and a second pixel which are adjacent to each other on the input image according to the input depth;
calculating a difference between the depth related data; and
determining whether the first pixel and the second pixel are continuous according to the difference;
performing a viewpoint image establishment, including:
if the first pixel and the second pixel are continuous, shifting the first pixel and the second pixel to form a shifted first pixel and a shifted second pixel, respectively, and establishing a first viewpoint image by filling an intermediate region between the shifted first pixel and the shifted second pixel according to pixel values of the shifted first pixel and the shifted second pixel;
detecting a hole region in each of the viewpoint images;
executing a process of object detection to output contour information according to the input image;
executing a process of object judgment to output distance information according to the input depth;
searching a search region adjacent to the hole region for a number of original pixels; and
filling the hole region according to the original pixels, the contour information, and the distance information.

20. The method according to claim 19, wherein in the step of filling the hole region, each of a plurality of hole pixels in the hole region is classified as an object or a background according to the original pixels, the contour information, and the distance information.

21. The method according to claim 19, wherein in the step of filling the hole region, a plurality of hole pixels in hole region and the original pixels are filled by proportionately expanding a plurality of original pixel values of the original pixels according to an object-background ratio of the original pixels.

22. The method according to claim 19, wherein in the step of filling the hole region, a plurality of hole pixels in the hole region are filled according to an average value of a plurality of original pixel values of the original pixels.

23. The method according to claim 19, wherein in the step of filling the hole region, a plurality of hole pixels in the hole region are filled by duplicating a plurality of original pixel values of the original pixels, or filled by duplicating a computation results of the original pixel values.

24. The method according to claim 19, wherein further comprising:
storing a plurality of reference pixel values, the reference pixel values respectively corresponding to a plurality of reference pixels.

25. The method according to claim 24, wherein in the step of filling the hole region, a variation criteria of the object is determined from the reference pixels and the original pixels, and a plurality of hole pixels in the hole region are filled according to the variation criteria.

26. The method according to claim 24, wherein in the step of filling the hole region, the reference pixels are applied to filling a plurality of hole pixels of the hole region and the original pixels by proportionately expanding a plurality of original pixel values of the original pixels according to an object-background ratio of the original pixels.

27. The method according to claim 24, wherein in the step of filling the hole region, the reference pixels are applied to filling a plurality of hole pixels of the hole region by duplicating a plurality of original pixel values of the original pixels.

28. The method according to claim 19, further comprising:
storing, temporally, a plurality of original pixel values of the original pixels.

29. The method according to claim 28, wherein the research region has a range dynamically varied with the number of hole pixels in the hole region.

30. The method according to claim 28, wherein the search region has a predefined range.

31. The method according to claim 19, wherein the first pixel and the second pixel are continuous if the difference is smaller than a threshold.

32. The method according to claim 19, wherein the viewpoint image establishment further comprises:
if the first pixel and the second pixel are not continuous, establishing a second viewpoint image by shifting each pixel of the input image according to the input depth.

33. The method according to claim 19, wherein the intermediate region of the first viewpoint image includes at least one intermediate pixel, and pixel value of the at least one intermediate pixel is determined by a weighted sum of the pixel values of the shifted first pixel and the shifted second pixel.

34. The method according to claim 19, further comprising:
performing an anti-aliasing procedure, including:
calculating amount of shifting from the input image to a third viewpoint image for a third pixel according to the input depth, and accordingly determining a target location where the third pixel is shifted to on the third viewpoint image; and
dividing at least one pixel located around the target location into a plurality of sub pixels.

35. The method according to claim 34, wherein the anti-aliasing procedure further comprises:
synthesizing pixel values of the sub pixels to form a shifted third pixel corresponding to the third pixel.

36. The method according to claim 34, wherein the amount of shifting for the third pixel is a non-integer multiple of pixel.

* * * * *